United States Patent
Hansen

(10) Patent No.: US 6,851,027 B2
(45) Date of Patent: Feb. 1, 2005

(54) MEMORY SYSTEM ORGANIZED INTO BLOCKS OF DIFFERENT SIZES AND ALLOCATION METHOD THEREFOR

(75) Inventor: Johannes K. Hansen, Maaloev (DK)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 09/953,356

(22) Filed: Sep. 17, 2001

(65) Prior Publication Data

US 2003/0056074 A1 Mar. 20, 2003

(51) Int. Cl.$^7$ .............................................. G06F 12/00
(52) U.S. Cl. ...................................................... 711/154
(58) Field of Search ......................... 710/56; 709/234; 711/154, 171

(56) References Cited

U.S. PATENT DOCUMENTS

| | | | | |
|---|---|---|---|---|
| 5,289,470 A | * | 2/1994 | Chang et al. | 711/173 |
| 5,784,698 A | * | 7/1998 | Brady et al. | 711/171 |
| 6,014,727 A | * | 1/2000 | Creemer | 711/118 |
| 6,397,273 B2 | * | 5/2002 | Chilton | 710/52 |

OTHER PUBLICATIONS

IEEE 100: the authoritative dictionary of IEEE standards terms/ IEEE Press—7$^{th}$ ed., c2000. pp. 152, 153 & 385.*
Microsoft Press computer dictionary: the comprehensive standard for business, school, library and home/Microsoft Press–2$^{nd}$ ed., c1994, pp. 69 & 149.*
American Heritage dictionary, Rev. ed. of: American Heritage dictionary of the English Language/Houghton Mifflin Co.—New College ed., c1976, pp. 251 & 457.*
Rich Seifert, The switch book: the complete guide to LAN switching technology/John Wiley & Sons, Inc., c2000, pp 612–618.*

* cited by examiner

Primary Examiner—David L. Robertson
(74) Attorney, Agent, or Firm—Kenyon & Kenyon

(57) ABSTRACT

In a memory management system, a memory is organized into blocks, each block having one of a plurality of predetermined block sizes. When a new data chunk of data is received by the memory management system, portions of the data chunk may be stored in blocks of the large block type until the remainder of the data chunk is less than the large block size. Thereafter, the remainder of the data chunk may be stored in another large block or a plurality of smaller blocks, depending upon its size.

9 Claims, 4 Drawing Sheets

(2 of 4 Drawing Sheet(s) Filed in Color)

100

200

1000

300

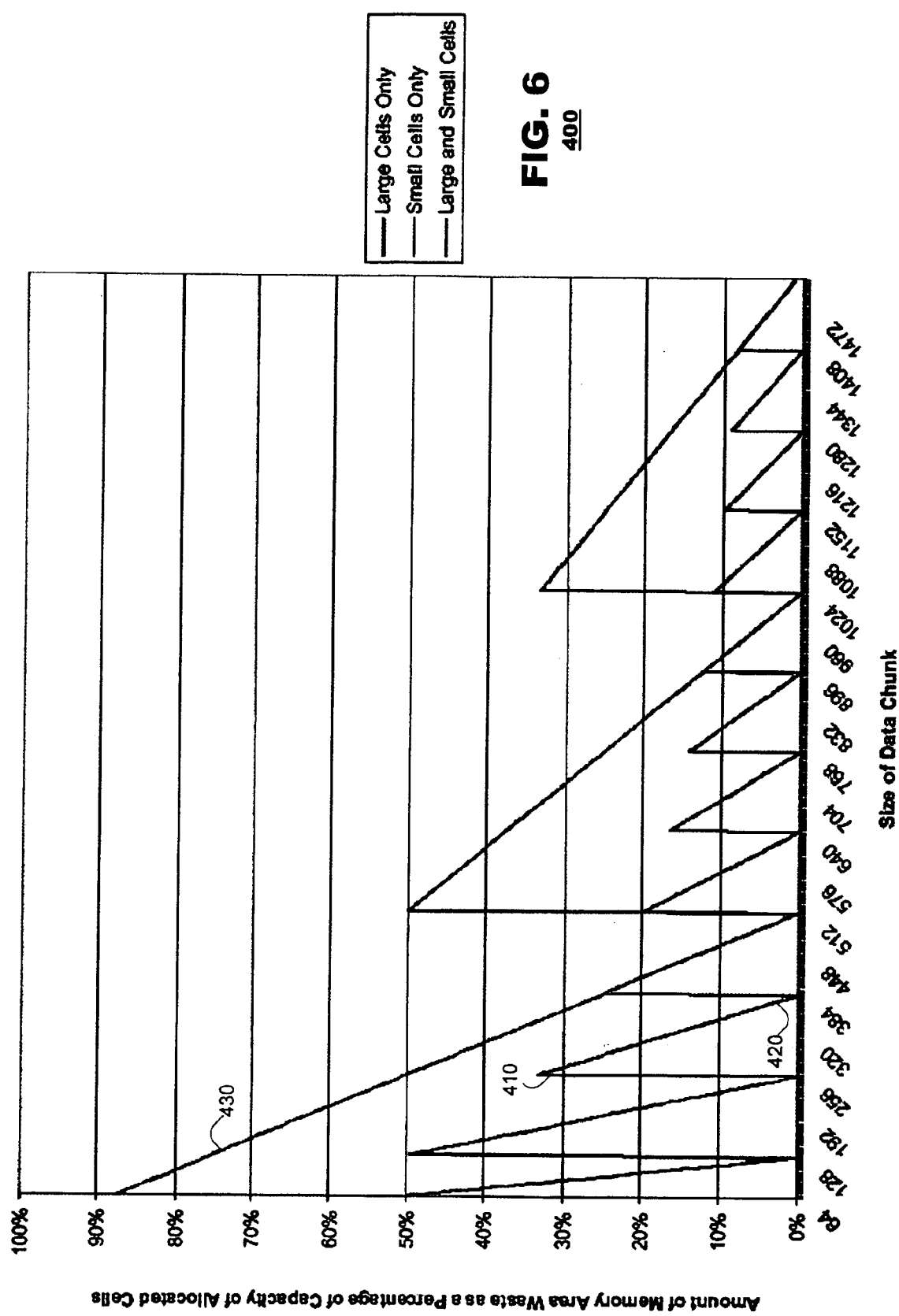

MEMORY SYSTEM ORGANIZED INTO BLOCKS OF DIFFERENT SIZES AND ALLOCATION METHOD THEREFOR

BACKGROUND

The present invention relates to memory systems in which addressable memory locations are organized into blocks and, specifically, to a system employing blocks having different sizes.

Traditionally, memory systems for storing data chunks of varying lengths (e.g. packets, Ethernet frames or fibre channel frames) are organized into blocks. The blocks typically have a common size to simplify the process by which the blocks are allocated and deallocated. The simplest solution would be to define a block size corresponding to the minimum length of a data chunk that is expected to be received. For example, for Ethernet frames that typically vary from 64–1518 bytes, a memory system may define a block size to be 64 bytes long and distribute larger frames across multiple blocks. Unfortunately, the act of addressing a new block, which occurs when a data read operation advances from one block to the next, has its own cost. Therefore, the inefficiency of distributing large data chunks across small blocks can result in lowered performance. Alternatively, one might define a block size to be the largest expected frame size or an intermediate frame size. However, use of blocks with such large granularities incurs waste as an allocated block may be only partially used.

Based upon these performance disadvantages, the inventor determined that there is a need in the art for a memory using blocks of at least two sizes.

BRIEF DESCRIPTION OF THE DRAWINGS

The patent or application file contains at least one drawing executed in color. Copies of this patent application publication with color drawings will be provided by the Office upon request and payment of the necessary fee.

FIG. 6 is a graph illustrating unused space in block in an Ethernet embodiment of the present invention.

DETAILED DESCRIPTION

Embodiments of the present invention provide a memory management system in which a memory is organized into blocks, each block having one of a plurality of predetermined block sizes. According to the embodiments, when a new data chunk of data is received by the memory management system, portions of the data chunk may be stored in blocks of the large block type until the remainder of the data chunk is less than the large block size. Thereafter, the remainder of the data chunk may be stored in another large block or a plurality of smaller blocks, depending upon its size.

Figure 1:
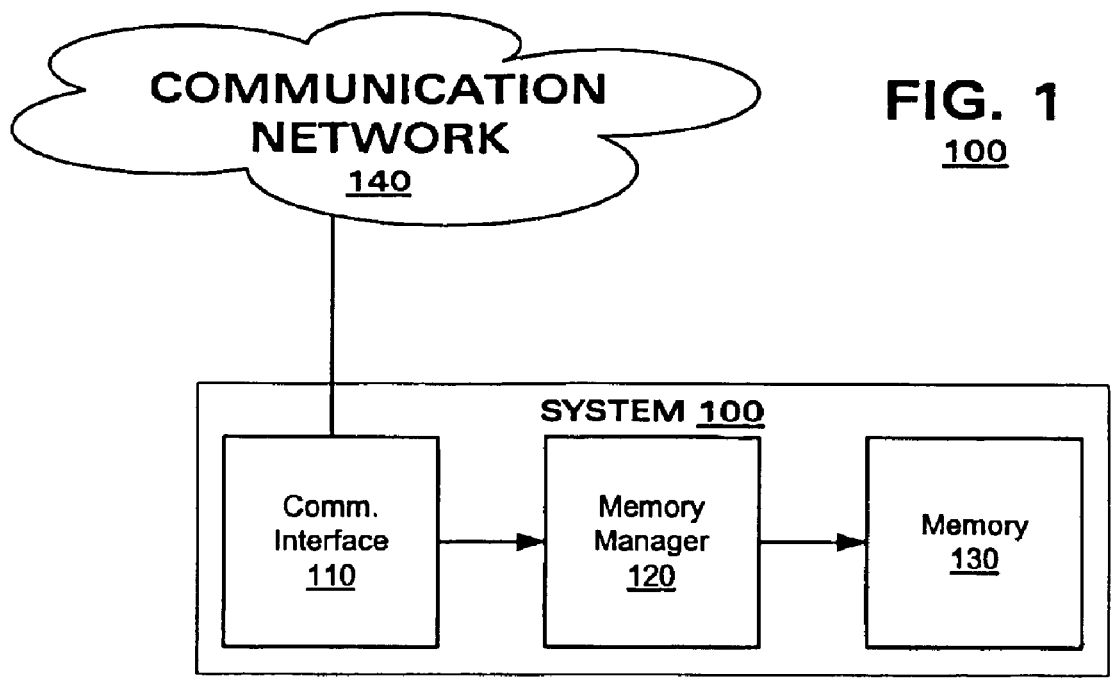
FIG. 1 is a partial block diagram of a processing system according to an embodiment of the present invention.

FIG. 1 is a partial block diagram of a system 100 in which the embodiments of the present invention find application. The system 100 may include a communication interface 110, a memory manager 120 and a memory 130. The system 100 may be provided in communication with a network 140. The network 140 may communicate data in variably sized data "data chunks." Various network communication protocols support data chunks of different sizes. For example, Ethernet traffic is conducted in Ethernet "frames" each of 64–1518 bytes in size. Alternatively, fibre channel traffic is conducted in frames each of 24–2136 bytes. Other communication protocols organize bursts of data into other logical units, whether they are called "frames," "packets," "datagrams" or "cells." Herein, these units are called "data chunks" so as to remain independent from any particular communication protocol.

Within the system 100, the communication interface 110 may receive and decode data chunks delivered to it by the network 140. The communication interface 110 may be a packet communicator, an Ethernet communicator or a fibre channel communicator, depending on the communication network 140 to which the system may communicate. It presents digital data representative of the data chunk to the memory manager 120.

The memory manager 120 causes the data chunk to be stored in the memory 130. According to an embodiment, the memory manager 120 may organize the memory 130 into a plurality of "blocks." Thus, to store new data chunks in memory 130 or evict old data chunks therefrom, the memory manager 120 may allocate and deallocate portions of memory on a block-by-block basis. Data may be stored to and read from addressable memory locations within the memory 130 one block at a time.

Figure 2:
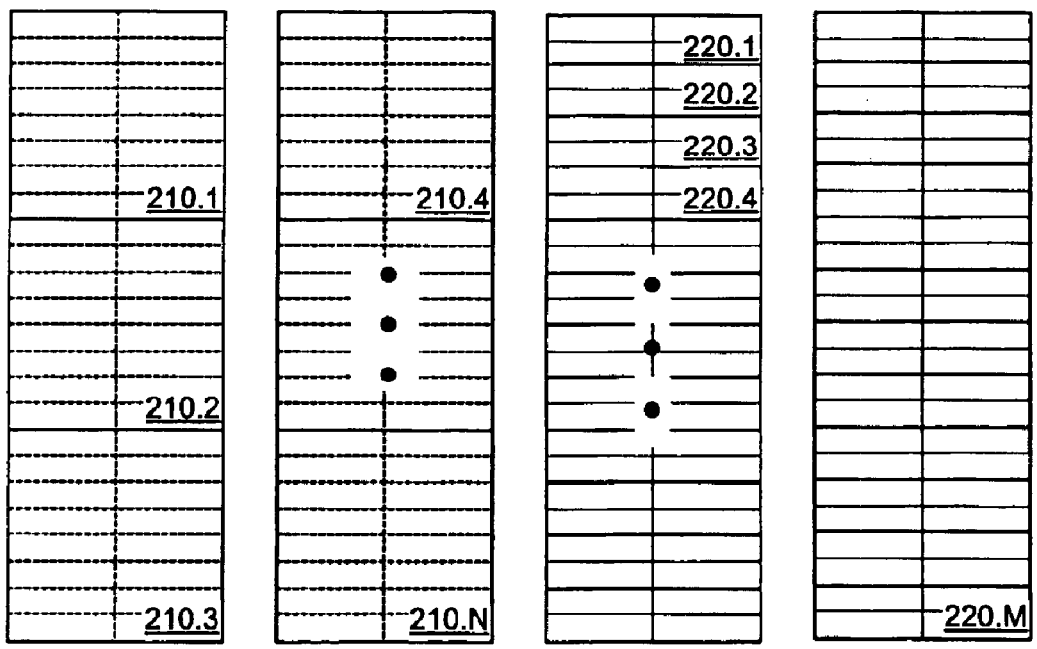
FIG. 2 is an exemplary memory map according to an embodiment of the present invention.

According to an embodiment, a variety of block size types are available. In the simplest embodiment, shown in FIG. 2, a memory 200 may include a first plurality of blocks 210.1–210.N of a first block size (a large block) and a second plurality of blocks 220.1–220.M of a second block size (a small block). Each of the block types may cover a plurality of addressable memory locations within the memory 200. By way of example, individual addressable memory locations within the memory 200 may be 16 bytes in size, small blocks (say 220.1) may be 128 bytes in size and large blocks (say, 210.1) may be 512 bytes in size. In such an embodiment, a small block 220.1 would cover eight memory addressable memory locations and a large block would cover 32 addressable memory locations. Of course, the sizes of individual addressable memory locations, small blocks and large blocks may be designed to suit a specific application for which the present embodiments may be used.

Figure 3:
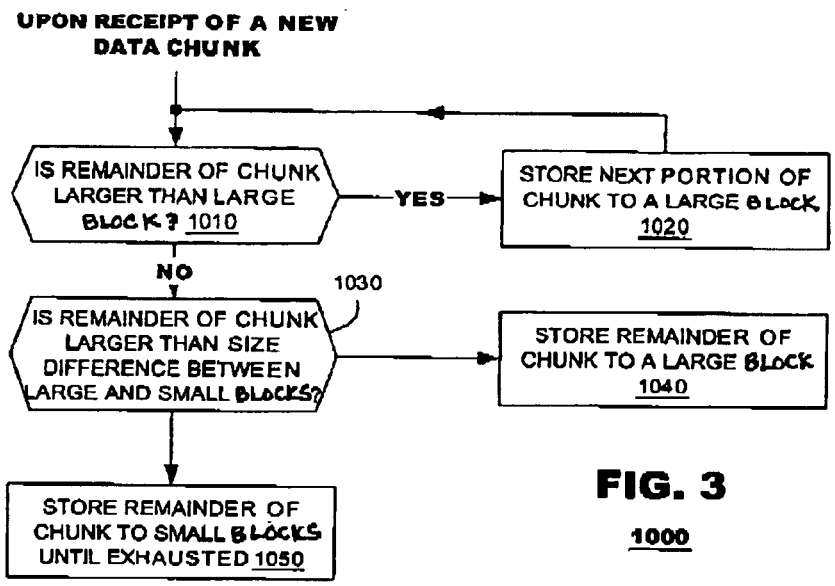
FIG. 3 is a flow diagram of a method according to an embodiment of the present invention.

FIG. 3 illustrates a memory allocation method 1000 according to an embodiment of the present invention. In the method, when a new data chunk is received, the method determines whether the data chunk (or remainder thereof) is larger than the size of the large block (box 1010). If so, the method allocates and stores a portion of the data chunk in one of the large blocks (box 1020) and returns to box 1010. Eventually, a remaining portion of the data chunk will not be larger than the size of the large block size. When this occurs, the method 1000 determines whether the size of the remaining data chunk is greater than a difference between the large block size and the small block size (box 1030). If so, another large block may be allocated for storage of the remaining data (box 1040). If not, the remaining data may be stored in a succession of small blocks until exhausted (box 1050). Small blocks may be allocated and used for this purpose.

Figure 4:
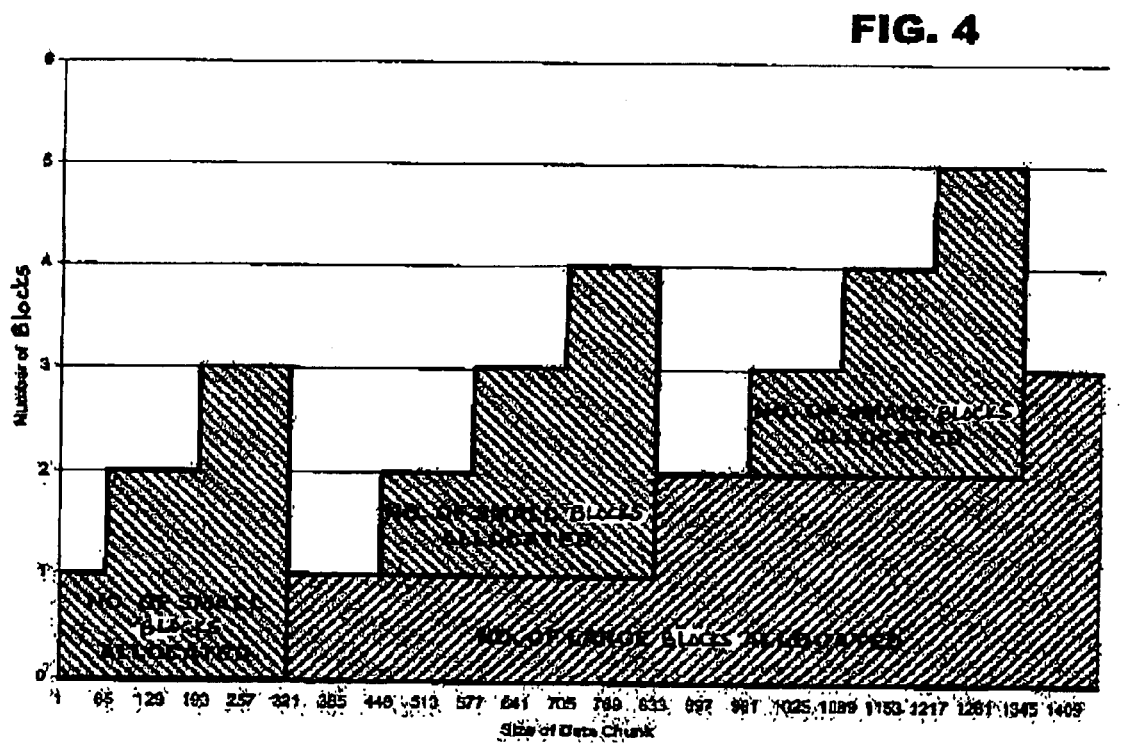
FIG. 4 is a graph illustrating allocation of blocks in an Ethernet embodiment of the present invention.
Figure 5:
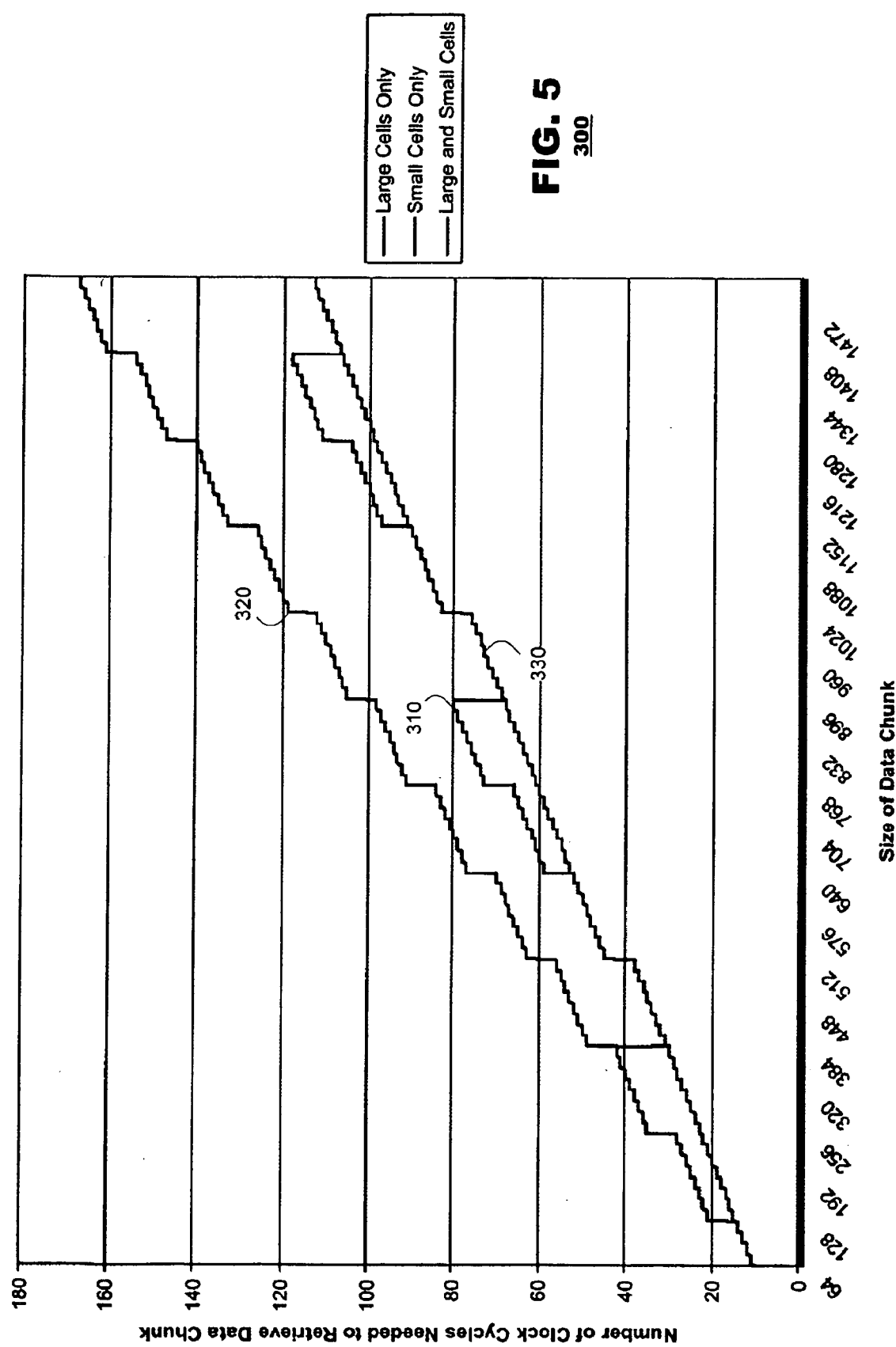
FIG. 5 is a graph illustrating time to access data in an Ethernet embodiment of the present invention.

Simulation studies suggest that partitioning of a memory 200 into a collection of large and small blocks can provide for high effective data transfer and limited waste relative to other systems having block of uniform size. FIGS. 4–6 illustrate several graphs illustrating response of the present embodiments in an Ethernet context and comparing performance of the present embodiments to other systems having only large blocks or only small blocks.

FIG. 4 illustrates allocation of blocks in the Ethernet example where a system may employ large blocks of 512 bytes and small bytes of 128 bytes each. As discussed, Ethernet frames may vary from 64 bytes to 1518 bytes in size. FIG. 4 illustrates a staggered progression where, for received Ethernet frames that are small (less than or equal to 384 bytes) only small blocks are allocated. For larger received Ethernet frames, large blocks and possibly small blocks may be allocated.

FIG. 5 is a graph 300 comparing access times of the present embodiment against access times of "large size only" and "small size only" systems applied to an exemplary DRAM memory system. In such a memory system, addressing overhead for any block, whether large or small, is assumed to consumed 6 clock cycles. Thereafter, data may be read from the blocks 16 bytes per clock cycle. Graph 310 demonstrates access times that may be incurred to read data chunks in a system employing large and small blocks (512 and 128 bytes respectively) according to the foregoing embodiments. Graph 320 demonstrates access times that would be incurred in a "small block only" system, where memory blocks are allocated only in 128 byte increments. Graph 330 demonstrates access times that would be incurred in "large block only" system, where memory blocks are allocated only in 512 byte increments. As can be seen, the performance of the dual sized memory system (graph 310) retrieves data at the same rate as the large block only system about 50% of the time. On average, the dual-sized embodiment consumes only 7.6% more time to access than large block only systems. When averaged across all possible data chunk lengths in an Ethernet system, a dual-sized retrieves data at an average of 66.88 clocks per data chunk whereas a large size only system retrieves data at an average of 62.16 clocks per data chunk. Thus, the access performance of the foregoing embodiments approximates that of the large size only systems.

The dual-sized embodiment outperforms small block only systems for all data chunks having a length greater than or equal to 384 bytes. When averaged across all possible data chunk lengths in an Ethernet system, the small block only system retrieves data at an average of 90.04 clocks per data chunk. The dual-sized embodiment can retrieve data with approximately 25% more efficiency than the small block only system.

FIG. 6 is a graph 400 comparing the amount of block waste in a system using dual-sized blocks according to the foregoing embodiments and systems having either large blocks only or small blocks only. Graph 410 illustrates the amount of waste in the dual-sized embodiment as described above. Graph 420 illustrates waste in a small block only system. These graphs are identical for all data chunk sizes. Thus, in the exemplary embodiment described above, the waste in the dual sized embodiment is identical to a small block only system.

Graph 430 illustrates waste in a large block only system. For data chunk sizes between 64 and 128 bytes, the large block system is particularly inefficient. Between 75–90% of the large block is wasted when storing such small data chunks. Approximately 26% more memory area is utilized for data in a dual block size system of the foregoing embodiments than would be utilized a large block only system.

When one compares FIGS. 5 and 6, it becomes clear that a dual-sized system effectively achieves the best characteristics of both systems. A dual-sized system enjoys relatives fast access times that characterize large block system and the smaller waste that make small block systems advantageous. No known block architecture achieves these advantages.

The graphs presented in FIGS. 4–6 illustrate operation of the foregoing embodiments of the invention in connection with a specific system, one tailored for use with Ethernet frames. As noted, the principles of the present invention have broader application and may be used with other systems, such a fibre channel system, having different frame sizes. Accordingly, it is expected that a memory system may employ large blocks having sizes that vary from the 512 byte length identified above and small blocks having sizes that vary from the 128 byte length identified above.

According to an embodiment, the number of small blocks and large blocks employed may vary based on the application for which the embodiments are to be used. For an Ethernet embodiment, it may be useful to provide small blocks and large blocks so that the total amount of memory space occupied by the small blocks is equal to the total amount of memory space occupied by the large blocks (a four-to-one ratio between small and large blocks, approximately). Alternatively, it may be advantageous to distribute the blocks according to a ratio of the relative sizes of the blocks. In an embodiment where a large block is eight times larger than a small block, for example, a memory system may employ eight times as many small blocks as large blocks.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A memory system, comprising a memory having been organized into a plurality of blocks of a first block size and a second plurality of blocks of a larger block size, wherein a total amount of memory space occupied by small blocks equals a total amount of memory space occupied by the large blocks.

2. A method for allocating a data chunk to memory, comprising:
   iteratively, until an unallocated portion of the data chunk is smaller than a large block size:
      determining whether an unallocated portion of the data chunk is larger than a large block size, and
      storing a portion of the data chunk to a large block in memory;
   if the unallocated portion is larger than a difference between the large block size and a small block size, storing the unallocated portion to another large block; and
   allocating the unallocated portion to small block,
   wherein a total amount of memory space occupied by small blocks a total amount of memory space occupied by the large blocks.

3. The method of claim 2, wherein the large block size is four times the small block size.

4. The method of claim 2, wherein for data chunks that are Ethernet frames, the large block size is 512 bytes and the small block size is 128 bytes.

5. The method of claim 2, wherein for data chunks that are fibre channel frames, the large block size is 512 bytes and the small block size is 128 bytes.

6. A method for allocating a data chunk to memory, comprising:
- iteratively, until an unallocated portion of the data chunk is smaller than a large block size:
  - determining whether an unallocated portion of the data chunk is larger than a large block size, and
  - if so, storing a portion of the data chunk to a large block in memory;
- if the unallocated portion is larger than a difference between the large block size and a small block size, storing the unallocated portion to another large block; and
- otherwise, allocating the unallocated portion to at least one small block, wherein a total amount of memory space occupied by the small blocks equals a total amount of memory space occupied by the large blocks.

7. The method of claim 6, wherein the large block size is four times the small block size.

8. The method of claim 6, wherein for data chunks that are Ethernet frames, the large block size is 512 bytes and the small block size is 128 bytes.

9. The method of claim 6, wherein for data chunks that are fibre channel frames, the large block size is 512 bytes and the small block size is 128 bytes.

* * * * *

UNITED STATES PATENT AND TRADEMARK OFFICE
CERTIFICATE OF CORRECTION

PATENT NO.    : 6,851,027 B2
DATED         : February 1, 2005
INVENTOR(S)   : Hansen It is certified that error appears in the above-identified patent and that said Letters Patent is hereby corrected as shown below:

<u>Column 4,</u>
Line 56, change "to small block," to -- to at least one small block, --;
Line 58, change "small blocks a total amount" to -- small blocks equals a total amount --;

<u>Column 5,</u>
Line 3, change "a large block size:" to -- a large cell block size --.

Signed and Sealed this

Sixteenth Day of August, 2005

JON W. DUDAS
*Director of the United States Patent and Trademark Office*